United States Patent
Kim et al.

(10) Patent No.: US 9,942,835 B2
(45) Date of Patent: Apr. 10, 2018

(54) METHOD OF SELECTING ACCESS

(71) Applicant: LG ELECTRONICS INC., Seoul (KR)

(72) Inventors: Taehyeon Kim, Seoul (KR); Laeyoung Kim, Seoul (KR); Jaehyun Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 14/902,313

(22) PCT Filed: Jan. 7, 2014

(86) PCT No.: PCT/KR2014/000157
§ 371 (c)(1),
(2) Date: Dec. 30, 2015

(87) PCT Pub. No.: WO2015/002369
PCT Pub. Date: Jan. 8, 2015

(65) Prior Publication Data
US 2016/0374010 A1    Dec. 22, 2016

Related U.S. Application Data

(60) Provisional application No. 61/842,395, filed on Jul. 3, 2013, provisional application No. 61/861,964, filed (Continued)

(51) Int. Cl.
*H04J 3/16* (2006.01)
*H04W 48/16* (2009.01)
(Continued)

(52) U.S. Cl.
CPC ....... *H04W 48/16* (2013.01); *H04W 28/0226* (2013.01); *H04W 48/18* (2013.01);
(Continued)

(58) Field of Classification Search
CPC .............. H04W 48/16; H04W 28/0226; H04L 61/3075
(Continued)

(56) References Cited

U.S. PATENT DOCUMENTS

2015/0009975 A1* 1/2015 Gupta ................... H04W 48/16
370/338

FOREIGN PATENT DOCUMENTS

KR    10-2012-0113664    10/2012
WO    2012/135467    10/2012
(Continued)

OTHER PUBLICATIONS

PCT International Application No. PCT/KR2014/000157, Written Opinion of the International Searching Authority dated Apr. 21, 2014, 1 page.

*Primary Examiner* — Gary Mui
*Assistant Examiner* — Wei-Po Kao
(74) *Attorney, Agent, or Firm* — Lee Hong Degerman Kang Waimey

(57) ABSTRACT

An example of the present disclosure provides a method of selecting access. The method of selecting access may include the steps of: selecting a first access point name (APN) that does not support IP flow mobility and seamless offload (IFOM) according to a first setting related to APN-based routing; checking a preferred flag when wireless local area network (WLAN) access for the IFOM is selected according to a second setting related to routing resulting in a collision between the first setting and the second setting; and using any one of the first setting and the second setting according to the preferred flag.

4 Claims, 14 Drawing Sheets

Related U.S. Application Data on Aug. 2, 2013, provisional application No. 61/872,751, filed on Sep. 1, 2013, provisional application No. 61/873,382, filed on Sep. 4, 2013.

(51) Int. Cl.
*H04W 48/18* (2009.01)
*H04W 28/02* (2009.01)
*H04L 29/12* (2006.01)
*H04W 8/26* (2009.01)
*H04W 40/20* (2009.01)
*H04W 84/12* (2009.01)

(52) U.S. Cl.
CPC .......... *H04L 61/3075* (2013.01); *H04W 8/26* (2013.01); *H04W 40/20* (2013.01); *H04W 84/12* (2013.01)

(58) Field of Classification Search
USPC ................................. 370/431–463
See application file for complete search history.

(56) References Cited

FOREIGN PATENT DOCUMENTS

| WO | 2012/135793 | 10/2012 |
|---|---|---|
| WO | 2013/022219 | 2/2013 |

* cited by examiner

METHOD OF SELECTING ACCESS

CROSS-REFERENCE TO RELATED APPLICATIONS

This application is the National Stage filing under 35 U.S.C. 371 of International Application No. PCT/KR2014/000157, filed on Jan. 7, 2014, which claims the benefit of U.S. Provisional Application No. 61/842,395, filed on Jul. 3, 2013, 61/861,964, filed Aug. 2, 2013, 61/872,751, filed Sep. 1, 2013, and 61/873,382, filed on Sep. 4, 2013, the contents of which are all hereby incorporated by reference herein in their entirety.

BACKGROUND OF THE INVENTION

Field of the Invention

The present invention relates to an access selection method.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that is progressed around 3GPP SA WG2 is a research into network technology to determine a structure of a network with an LTE work of a 3GPP TSG RAN and support mobility between model networks and one of key standardization issues of the 3GPP. This is a work for developing a 3GPP system to a system that supports various wireless access technologies based on an IP and the work has been progressed for the purpose of an optimized packet based system that minimizes a transmission delay with a further improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 is a Structural Diagram of an Evolved Mobile Communication Network.

One of largest features of the network structure of FIG. 1 is based on a 2 tier model of eNodeB of an evolved UTRAN and a gateway of a core network and although accurately coincides with each other, the eNodeB 20 has functions of NodeB and RNC of an existing UMTS system and the gateway has an SGSN/GGSN function of the existing system.

Another key feature is that a control plane and a user plane between an access network and the core network are exchanged to different interfaces. In the existing UMTS system, one Iu interface exists between an RNC and an SGSN, while a mobility management entity (MME) 51 that undertakes processing of a control signal has a structure separated from a gateway (GW), and as a result, two interfaces of S1-MME and S1-U are respectively used. The GW includes a serving-gateway (hereinafter, referred to as 'S-GW') 52 and a packet data network gateway (hereinafter, referred to as 'PDN-GW' or 'P-GW') 53.

FIG. 2a Shows an Example of an as IP Flow Mobility and Seamless Offload (IFOM) Technique, and FIG. 2b Shows an Example of an Multi Access PDN Connectivity (MAPCON) Technique.

Recently, with an explosive increase in data, there is an increase in a congestion of a core network of a mobile communication operator. As a way of solving this problem, there is an attempt to offload data of a user equipment (UE) to a wired network without via the core network.

As a result of such discussion, a technique such as IP flow mobility and seamless offload (IFOM), none-seamless WLAN offloading (NSWO), multi access PDN connectivity (MAPCON), or the like has been proposed to support a multiple radio access. The IFOM technique is a technique of transmitting data by using a 3GPP access and a Wi-Fi access aggregated with one PDN or P-GW. Further, the MAPCON technique is a technique of transmitting data by using each of the 3GPP access and the Wi-Fi access through respective PDN connections.

As shown in FIG. 2a, the IFOM provides an identical PDN connection simultaneously through different several accesses. The IFOM provides a seamless offload to a WLAN. In addition, the IFOM provides a delivery of an IP flow of one identical PDN connection from one access to another access.

In addition, referring to FIG. 2a, the non-seamless WLAN offloading (NSWO) technique provides a non-seamless offload to the Wi-Fi access, that is, an offload in which traffic may be suspended.

Meanwhile, as shown in FIG. 2b, the MAPCON technique is to establish several PDN connections, simply, IP flows, to different APNs through different access systems.

According to the MAPCON technique, a UE 10 may create a new PDN connection on an access which is not used previously. Alternatively, the UE 10 may create a new PDN connection on one access selected from several accesses used previously. Alternatively, the UE 10 may move the entirety or part of all PDN connections, which have already been connected, to another access.

FIG. 3 Shows an Access Network Discovery and Selection Function (ANDSF), and FIG. 4 Shows an Exemplary Structure of an Inter-System Routing Policy (ISRP) Provided by the ANDSF.

As described above, in order to offload traffic to a normal data communication network, an operator may provide a policy to a UE, and the UE may offload its data to a wireless LAN according to the policy.

For provisioning of such a policy to the UE, an access network discovery and selection function (ADNSF) based on 3GPP is improved to be capable of providing a policy related to the wireless LAN.

As shown in FIG. 3, an ANDSF 61 may exist in a home public land mobile network (HPLMN) of a UE 10.

As shown in FIG. 4, the ANDSF provides an inter-system routing policy (ISRP). The ISRP implies a routing policy for data traffic between a 3GPP access system and a non-3GPP access system.

In this case, as described above, IFOM enables a plurality of PDN connections through several accesses by using the same APN. In this case, the ISRP provides an IP flow-based rule, i.e., ForFlowBased.

In addition, for the aforementioned NSWO, the ANDSF may provide a policy for a non-seamless offload, i.e., ForNonSeamlessOffload, to the ISRP.

On the other hand, recently, in 3GPP, there is on-going research on an inter APN routing policy (IARP) for selecting an IP interface on the basis of the APN under the name of operator policies for IP interface selection (OPIIS). In the IARP, a priority is designated for several APNs and NSWOs so that an IP interface having a top priority can be selected among IP interfaces available for a specific IP flow.

However, a collision problem may occur since rules are different from each other between the existing ISRP and the newly discussed IARP. Due to such a collision, a UE eventually cannot select an optimal interface.

SUMMARY OF THE INVENTION

Accordingly, disclosures of the present specification aim to solve the aforementioned problem.

To achieve the aforementioned aim, one disclosure of the present specification provides an access selection method. The method may comprise: selecting a first access point name (APN) not supporting IP flow mobility and seamless offload (IFOM) according to a first configuration related to APN-based routing; checking a preferred flag when a wireless local area network (WLAN) access for the IFOM is selected according to a second configuration related to routing and thus a collision occurs between the first configuration and the second configuration; and using any one of the first configuration and the second configuration according to the preferred flag.

The first configuration may be an inter APN routing policy (IARP), and the second configuration may be an inter-system routing policy (ISRP).

The IARP and the ISRP may be received from a node for managing an access network discovery and selection function (ANDSF). The method may further comprise: receiving the IARP and the ISRP from an ANDSF of a home network; and receiving the ISRP from an ANDSF of a visited network when roaming. If there is a collision between the IARP received from the ANDSF of the home network and the ISRP received from the ANDSF of the visited network, any one of them may be used according to the preferred flag.

If any one of them is used according to the preferred flag, the other one may be ignored.

The preferred flag may be received together with the first configuration.

Another disclosure of the present invention provides a user equipment. The user equipment may comprise: a transceiver; and a processor for controlling the transceiver. The processor may be configured to: select a first access point name (APN) not supporting IP flow mobility and seamless offload (IFOM) according to a first configuration related to APN-based routing; check a preferred flag when a wireless local area network (WLAN) access for the IFOM is selected according to a second configuration related to routing and thus a collision occurs between the first configuration and the second configuration; and use any one of the first configuration and the second configuration according to the preferred flag.

According to a disclosure of the present specification, a policy to be selected by a user equipment (UE) is clarified when applying an inter APN routing policy (IARP) and an inter-system routing policy (ISRP). Further, when roaming to a different operator's visited network, a selection of a policy to be applied is clarified. In doing so, a policy intended by a home operator and a visited operator can be accurately applied. The present invention can be used when a preference of the home operator and a preference of a different operator are contrary to each other for a specific Internet protocol (IP) flow (IP address, Application identifier (ID), application protocol, etc.). That is, if an IARP-based result and an ISRP-based result are different from each other, any one of them may be selected to eliminate ambiguity.

DESCRIPTION OF EXEMPLARY EMBODIMENTS

Figure 1:
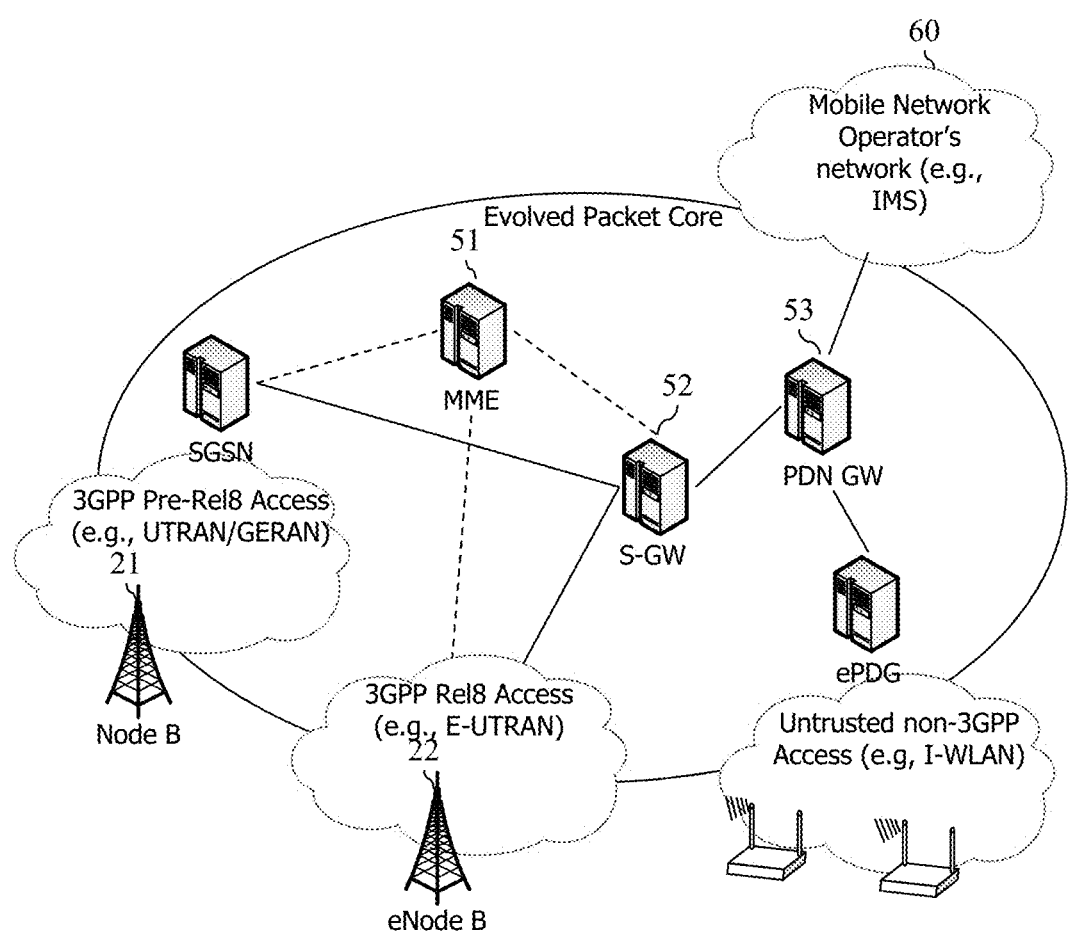
FIG. 1 is a structural diagram of an evolved mobile communication network.
Figure 2A:
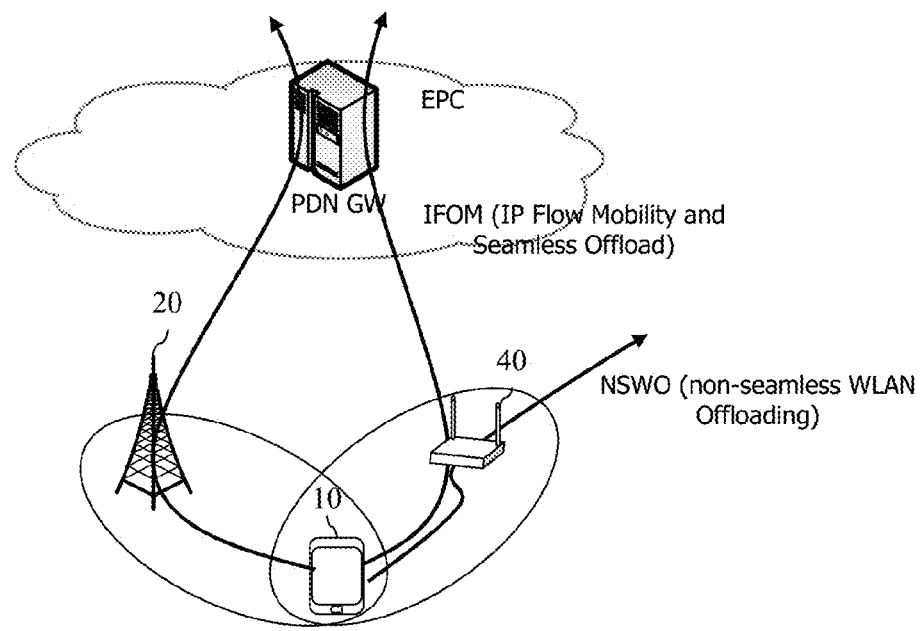
FIG. 2a shows an example of an IP flow mobility and seamless offload (IFOM) technique.
Figure 2B:
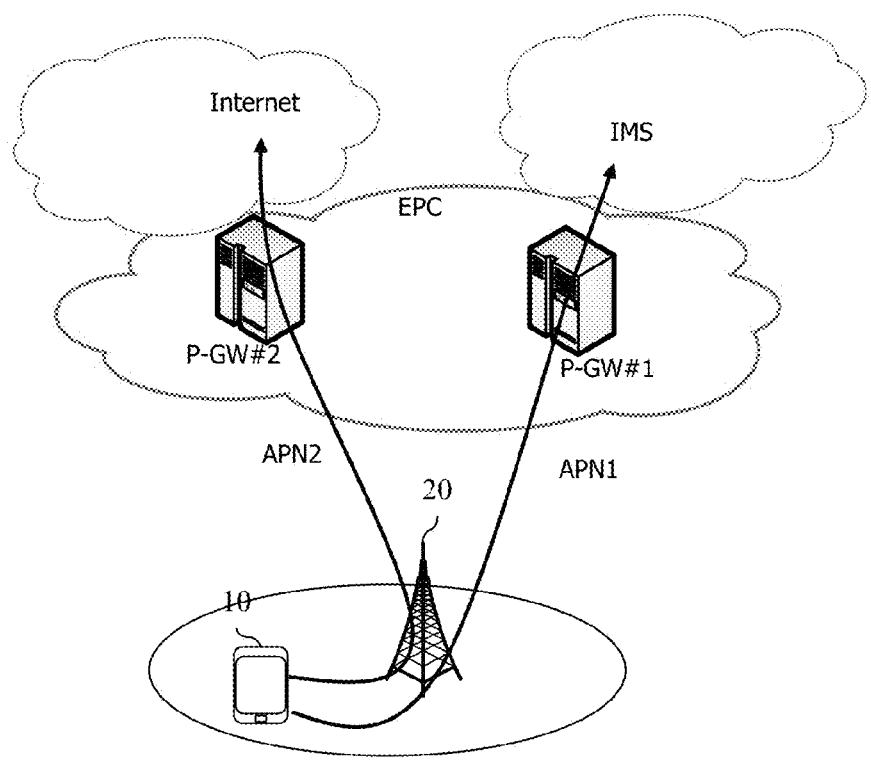
FIG. 2b shows an example of an multi access PDN connectivity (MAPCON) technique.
Figure 3:
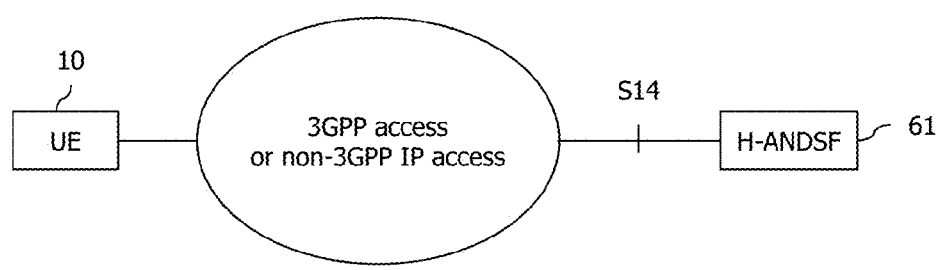
FIG. 3 shows an access network discovery and selection function (ANDSF).
Figure 4:
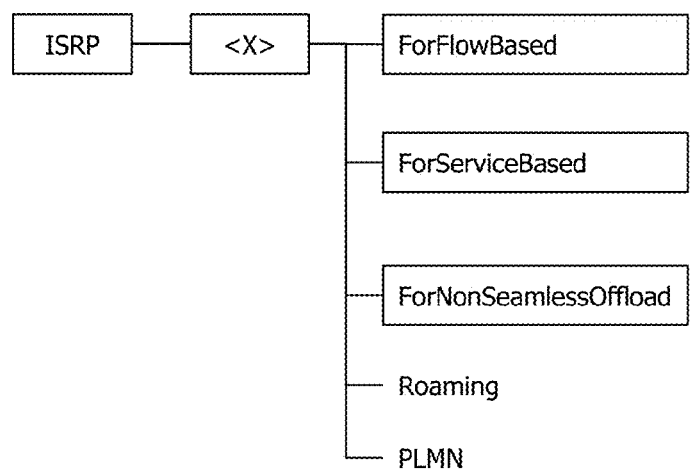
FIG. 4 shows an exemplary structure of an inter-system routing policy (ISRP) provided by an ANDSF.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

EPS: Means a core network supporting a long term evolution (LTE) network as an abbreviation of Evolved Packet System. Network of a type in which the UMTS is evolved.

PDN (Public Data Network): An independent network at which a server providing a service is positioned Session: The session is a passage for data transmission and the unit thereof may be PDN, bearer, IP flow unit, or the like. The respective units may be divided into a whole unit (APN or PDN unit) of a target network, a unit (Bearer unit) divided as a QoS therein, and a destination IP address unit.

PDN connection: Indicates connection from the terminal to the PDN, that is, association (connection) between the terminal expressed as the ip address and the PDN expressed as the APN. The PDN connection means connection between entities (terminal—PDN GW) in the core network so as to form the session.

UE Context: UE context information used to manage the UE in the network, that is, context information constituted by a UE id, mobility (present location, and the like), an attribute (QoS, priority, and the like) of the session.

APN (Access Point Name): Provided to UE as a name of an access point managed in the network. That is, the APN indicates a name (string) of the PDN. The corresponding PDN for transmitting and receiving data is decided based on the name of the access point.

NodeB: Installed outdoor as a base station of the UMTS network and a cell coverage scale corresponds to a macro cell.

eNodeB: Installed outdoor as a base station of an evolved packet system (EPS) and the cell coverage scale corresponds to the macro cell.

MME: Serves to control each entity in the EPS in order to provide a session for the UE and mobility as an abbreviation of Mobility Management Entity.

Home NodeB: Installed outdoor as a base station of the UMTS network and the cell coverage scale corresponds to a Femto cell.

Home eNodeB: Installed outdoor as a base station of an EPS network and the cell coverage scale corresponds to the Femto cell.

Home (e)NodeB: Indicates a Home NodeB and a Home eNodeB.

Closed Subscriber Group (CSG): Means a group of one or more Home (e)NodeBs. The Home (e)NodeBs that belong to the CSG have the same CSG ID. Each user receives use permission for each CSG.

Selected IP Traffic Offload (SIPTO): Is technology that offloads specific IP traffic to not a mobile communication operator (for example, a 3GPP or a 3GPP2) but a wired network such as the Internet when the UE transmits the specific IP traffic through the Home (e)NodeB or the (e)Node B.

Local IP Access (LIPA): Is technology that connects the Home (e)NodeB to a local network (that is, a small-scale network, for example, a family home network or a corporate network) and allows the UE in the Home (e)NodeB to access the local network through the Home (e)NodeB.

ANDSF (Access Network Discovery and Selection Function): Provides a policy for discovering and selecting an access that can be used by the UE in unit of an operator as one network entity.

ISRP (Inter System Routing Policy): Is a routing policy including a rule container such as IFOM, MAPCON, NSWO, etc.

IFOM (IP Flow mobility): Is a technique for performing routing to a preferred access when a PDN connection can achieve two accesses as a routing method for each IP flow.

NSWO (Non-seamless WLAN Offloading): Is a technique for routing a specific IP flow non-seamlessly through a WiFi access.

OPIIS (Operator Policies for IP Interface Selection): Uses IARP (Inter APN Routing Policy) which is an ANDSF policy as a technique for selecting a preferred IP interface for a specific IP flow to be transmitted.

Figure 5:
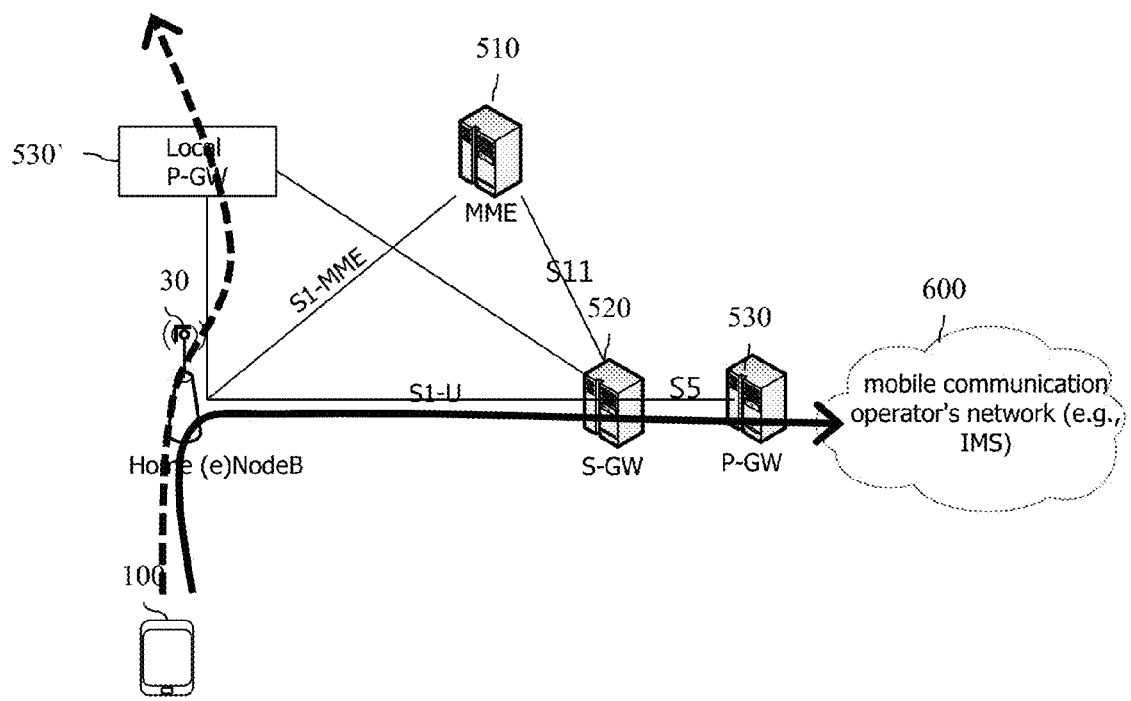
FIG. 5 shows the concept of selected IP traffic offload (SIPTO) or local IP access (LIPA) through a home (e)NodeB.

FIG. 5 Shows the Concept of SIPTO or LIPA Through a Home (e)NodeB.

In addition to the offloading to the WLAN described above, there is an ongoing attempt for increasing a cell capacity to support a high-volume service such as multimedia content, streaming, or the like and an interactive service in the $3^{rd}$ or $4^{th}$ generation mobile communication system.

As such, a high frequency band has been used to increase the cell capacity, and there has been an approach for decreasing a cell radius. A home (e)NodeB has been recently proposed as an approach for increasing the cell capacity by using a cell having a small cell radius, i.e., a small cell, such as a pico cell, a femto cell, or the like.

As can be seen from FIG. 5, when a UE 100 is granted for an access to a home (e)NodeB 30, the UE 100 may use a service through a mobile communication operator's network 60 by accessing the home (e)NodeB 30. That is, as indicated by a solid line, the UE 100 may access the mobile communication operator's network 60 via an S-GW 520 and a P-GW 530 through the home (e)NodeB 30.

However, as large-volume data is transmitted more and more frequently, there is a problem in that congestion occurs in the S-GW 520 and the P-GW 530.

In order to solve this problem, mobile communication operators have changed the S-GW 520 and the P-GW 530 to have a high capacity, or have added new equipment, which may lead to a disadvantage of requiring a significantly high cost. Further, an amount of data to be transmitted and received is exponentially increased day by day, which immediately leads to a disadvantage of overloading.

Meanwhile, various methods of optimizing the S-GW 520 and the P-GW 530 have been proposed without having to add the mobile communication network. For example, it has been proposed a technique (i.e., selected IP traffic offload (SIPTO)) for offloading a path via nodes of a public network, i.e., a wired network, without having to perform transmission/reception via a path through the mobile communication operator's network 60.

That is, the selected IP traffic offload (SIPTO) technique offloads specific IP traffic (e.g., an Internet service) of the UE 100 to nodes of a wired network, as indicated by a dotted line, without via nodes in the mobile communication operator's network 60. In order to support the SIPTO, in case of an EPS, a function of a P-GW is additionally required in a local network in which the home (e)NodeB 30 is used. As such, the P-GW added to the local network is called a local P-GW 530'.

On the other hand, the UE 100 may have access to a local network of home or business through the home (e)NodeB 30 by using a local IP access (LIPA) technique. The local P-GW 530' is also required to support the LIPA. Therefore, traffic to the local network in the home or business is directed to the local P-GW 530' through the home (e)NodeB 30. In order to access the local network in the home or business, an LIPA PDN connection is created by using an APN for the LIPA.

The aforementioned SIPTO technique can be distinguished according to 3GPP release. In release 10, SIPTO as 3GPP radio access network (RAN), so called SIPTO above RAN, is standardized. In release 12, there is an ongoing standardization on SIPTO into a local network, so called SIPTO at the local network. Further, there may be an SIPTO per IP flow as an SIPTO technique available in the future.

The SIPTO above RAN technique is defined in 3GPP release 10, and is a technique for offloading traffic through a node of a core network close in distance to an access of the UE. This is implemented by relocating a GW (S-GW, P-GW) of the core network. In this case, an operator may manage SIPTO grant information for each APN. Regarding an operation thereof, when the UE 100 completes a mobility process, an MME 510 determines whether to relocate a new GW according to a location of the UE 100, and when the GW relocation is determined, deactivates a corresponding PDN connection and requests a reactivation to the UE 100. When the UE 100 re-requests a creation of a PDN connection according to the reactivation request, the MME 510 allocates the new GW.

The SIPTO at the local network technique is under discussion in 3GPP release 12, and has a purpose of offloading Internet traffic in unit of an APN in a local network. That is, the SIPTO at the local network technique has a purpose of accessing a specific IP network such as the Internet without via an operator network when the UE 100 has access to an (e)NodeB or a home (e)NodeB. For this, grant information is managed in unit of a user or in unit of an APN. Further, when the UE 100 has access to the home (e)NodeB, the SIPTO at the local network may be applied irrespective of a presence/absence of a CSG membership. Traffic that can be applied until now is only Internet traffic. Regarding an operation thereof, an MME determines whether it is to be applied similarly to the aforementioned SIPTO above RAN, a PDN connection is deactivated, and a reactivation is requested to the UE 100 to allocate a new GW. In this case, in case of a stand-alone GW, an S-GW and an L-GW exist together in a local network, and in a co-existing case, the L-GW exists together in the home (e)NodeB.

On the other hand, although the SIPTO per IP flow technique is under discussion in 3GPP, it is not finally selected as a standard up until now. The SIPTO per IP flow technique is a technique of offloading data by selecting a PDN connection for each IP flow through an available PDN connection. The aforementioned two techniques are comparable with a case where offloading is achieved in unit of the APN (in unit of the PDN connection). More specifically, when the UE 100 has a PDN connection and an LIPA connection to a core network, traffic directed to the core network may be offloaded through an LIPA PDN connection. Although the LIPA is a technique in which a home network is targeted, this is possible since the home network is also connected to the Internet.

Figure 6A:
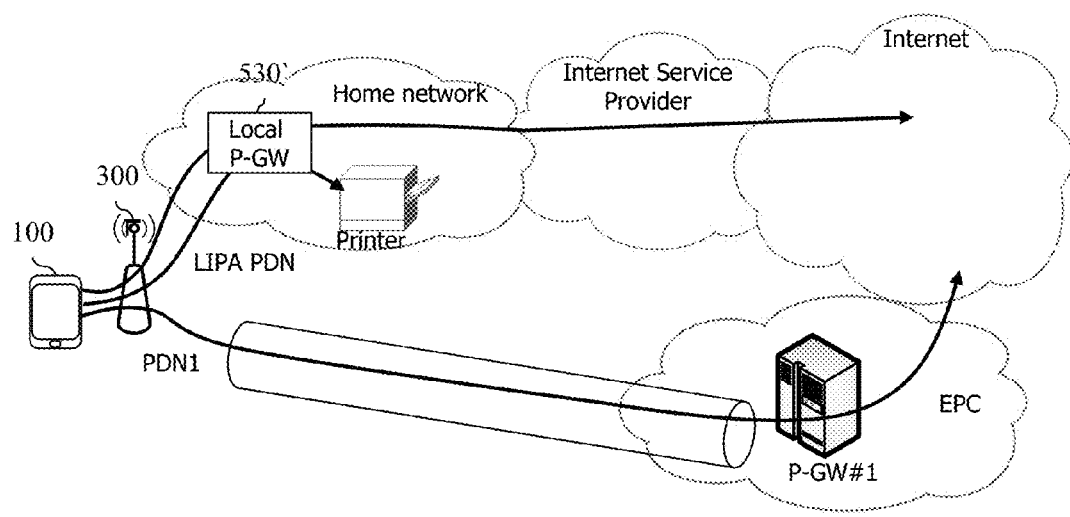
FIG. 6a shows SIPTO through LIPA.
Figure 6B:
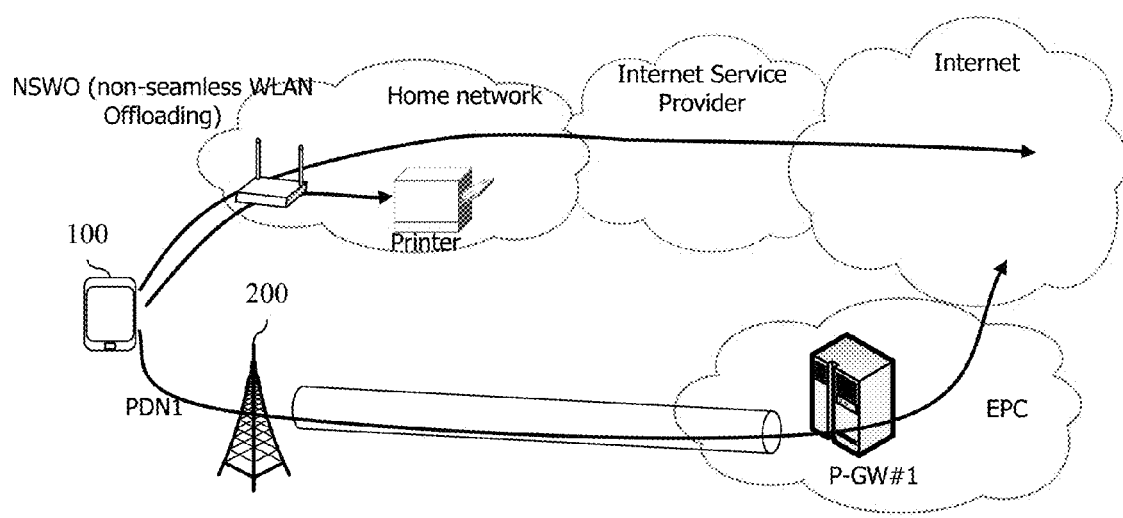
FIG. 6b shows none-seamless WLAN offloading (NSWO).

FIG. 6a Shows SIPTO Through LIPA, and FIG. 6b Shows NSWO.

As can be seen from FIG. 6a, if a user moves into a building in which a small cell 300 such as a home (e)NodeB is installed, SIPTO may be used by using an LIPA PDN connection. That is, when transmitting Internet traffic, it may be transmitted through the LIPA PDN. Herein, the LIPA PDN connection is created through a user interaction or configuration, and an SIPTO PDN connection is determined in a network by a control of an operator to reconfigure a PDN connection, and in this manner, the two techniques can be distinguished from each other.

Meanwhile, as can be seen from FIG. 6b, if the user moves into a building in which a WLAN is installed while using an operator service and the Internet through one PDN connection (i.e., PDN1) from the outside, Internet traffic is transmitted through the WLAN according to an operator policy. In this case, traffic may be suspended when the traffic is offloaded through the WLAN. Therefore, such offloading is called none-seamless WLAN offloading (NSWO).

Figure 7A:
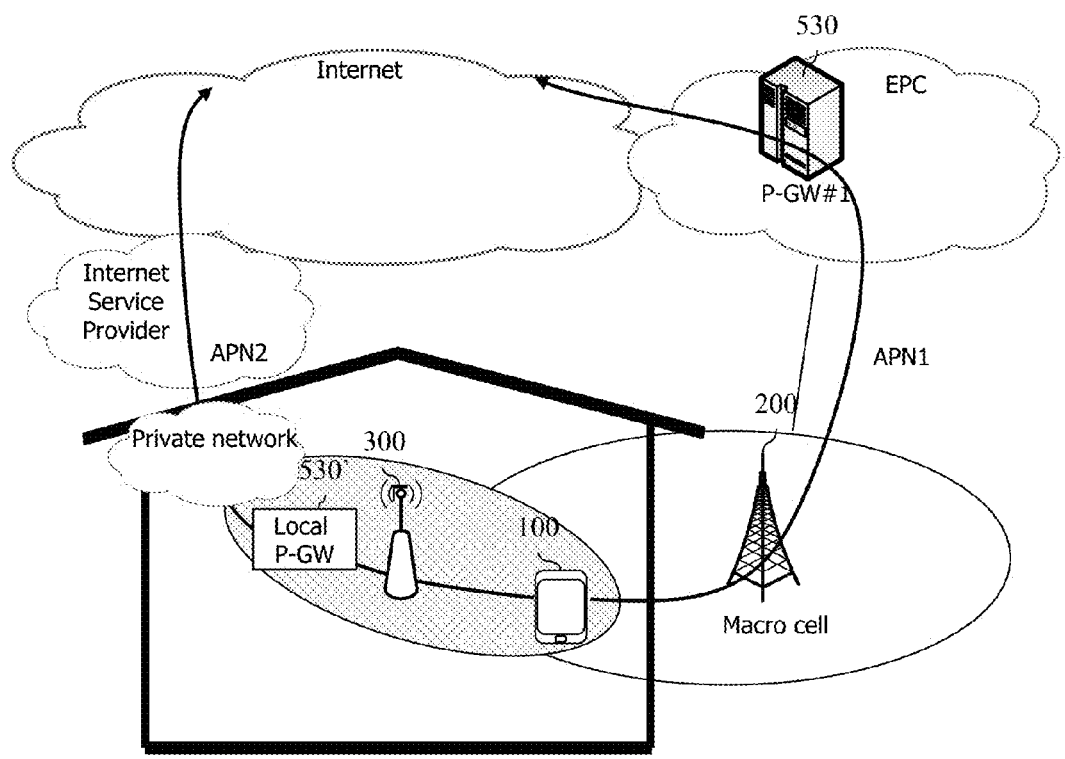
FIG. 7a and FIG. 7b show a situation in which an available PDN connection is plural in number.
Figure 7B:
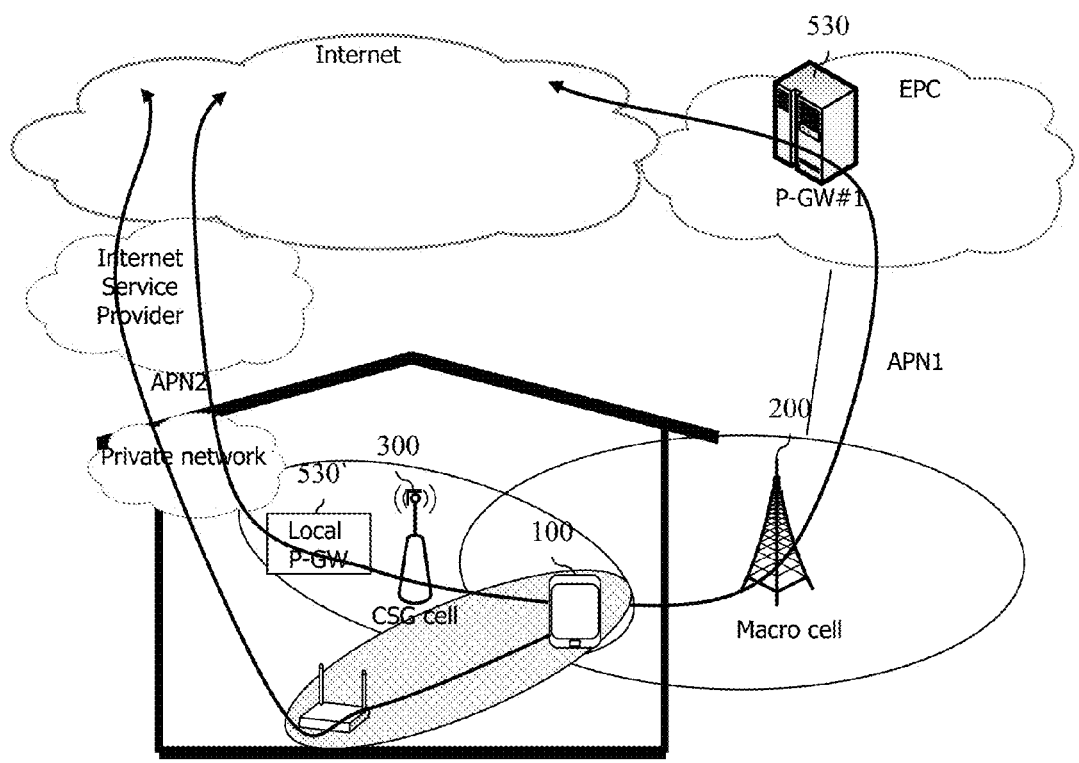

FIG. 7a and FIG. 7b Show a Situation in Which an Available PDN Connection is Plural in Number.

As can be seen from FIG. 7a, a UE 100 can access the Internet through a macro cell 200 and an EPC from the outside, but can access the Internet in a building in which a small cell such as a home (e)NodeB is installed through a local P-GW 530', a private network, and a network of an Internet service provider.

In addition, as can be seen from FIG. 7b, the UE 100 may access the Internet through the macro cell 200 and the EPC from the outside, but can access the Internet in the building in which the small cell such as the home (e)NodeB is installed through the local P-GW 530', the private network, and the network of the Internet service provider. Further, if a WLAN is installed inside the building, an Internet access may be achieved through the WLAN, the private network, and the network of the Internet service provider.

As described up to now, if there is a plurality of available PDN connections, traffic may be offloaded by performing routing in unit of an IP flow.

As such, in order to route the traffic in unit of the IP flow, an inter APN routing policy (IARP) is proposed. As described above, the IARP allows that an IP interface having a top priority is selected among IP interfaces available for a specific IP flow by designating a priority for several APNs and NSWOs.

The IARP may be provided by the ANDSF, and the IARP may provide a policy for NSWO, e.g., ForNonSeamlessOffload.

Figure 8:
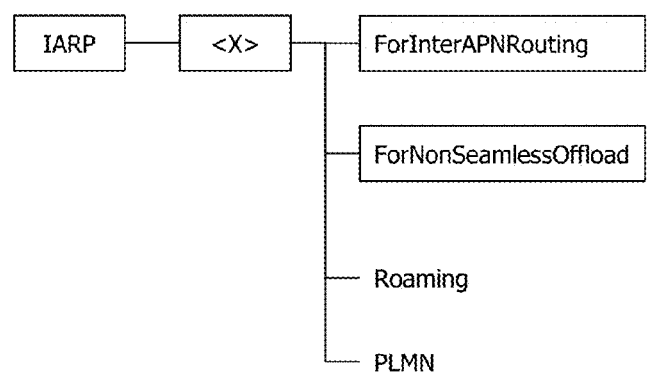
FIG. 8 shows an example of a structure of an ISRP provided by an ANDSF.
Figure 9:
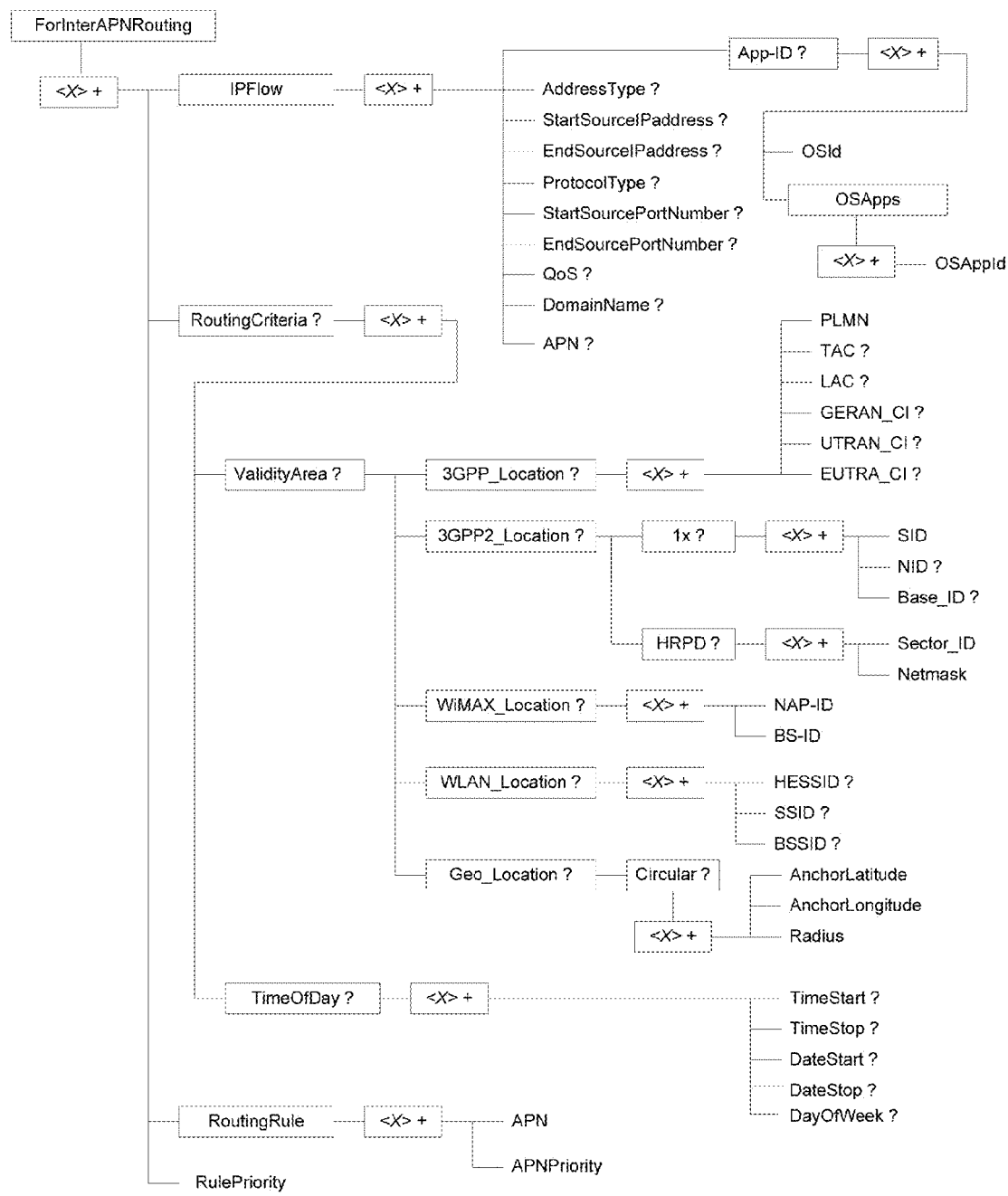
FIG. 9 shows an example of a structure of ForinterAPN-Routing of FIG. 8 in greater detail.

FIG. 8 Shows an Example of a Structure of an ISRP Provided by an ANDSF, and FIG. 9 Shows an Example of a Structure of ForinterAPNRouting of FIG. 8 in Greater Detail.

As shown in FIG. 8, the IARP may include a ForInterAPNRouting rule for APN selection and a ForNonSeamlessOffload rule.

As shown in FIG. 9, in the ForInterAPNRouting rule, a priority is predetermined for each APN so that a UE can select a preferred PDN connection when several PDN connections are available for a specific IP flow.

However, as described above, a collision problem may occur since rules are different from each other between the existing ISRP and the newly discussed IARP. This will be described in detail.

Specifically, a UE 100 can apply the IARP or the ISRP for traffic transmission. First, when conforming to the IARP, an APN or an NSWO may be selected as a preferred IP interface. In addition, when conforming to the ISRP, a preferred radio access (3GPP, Wi-Fi) or the NSWO may be selected through the IFOM. That is, a routing path may be expressed by the APN, NSWO, radio access, etc.

When both of the ISRP and the IARP are present as described above, the UE 100 first evaluates the IARP to select the preferred routing path and subsequently evaluates the ISRP. In this case, if the UE 100 selects the NSWO according to the IARP, the ISRP is not evaluated. However, if the UE 100 selects the NSWO according to the ISRP, the NSWO is directly applied. That is, if both of them are evaluated to generate respective results and if the NSWO is selected from one of the two, the NSWO is selected. Otherwise, the APN may be selected according to the IARP, and the radio access may be selected through an IFOM rule according to the ISRP. In this case, if the APN is irrelevant to the selected IFOM rule, one of the two must be selected. For example, if a plurality of accesses are possible in a PDN connection of the selected APN, one access must be finally selected. The access selection may be acquired by evaluating the IFOM rule, and if the IFOM rule selected from the ISRP can be applied to the APN selected from the IARP for the access selection, it is directly applied (see Case 1 below). Otherwise, the IARP prefers a PDN connection corresponding to a specific APN, and the ISRP prefers another PDN connection in which the IFOM is possible (see Case 2 below). That is, since the IARP and ISRP results are different from each other, one of the two must be selectable.

TABLE 1

| Results of IARP | Results of ISRP | Final result |
|---|---|---|
| NSWO | NSWO | NSWO |
| NSWO | IFOM | NSWO |
| NSWO | NONE | NSWO |
| APN | NSWO | NSWO |

TABLE 1-continued

| Results of IARP | Results of ISRP | Final result |
|---|---|---|
| APN | IFOM | Case 1. APN + IFOM (when APN is related to IFOM) Case 2. APN or IFOM (when APN is not related to IFOM) |
| APN | NONE | APN |
| NONE | NSWO | NSWO |
| NONE | IFOM | IFOM |
| NONE | NONE | NONE |

This will be described for example with reference to FIG. 10.

Figure 10:
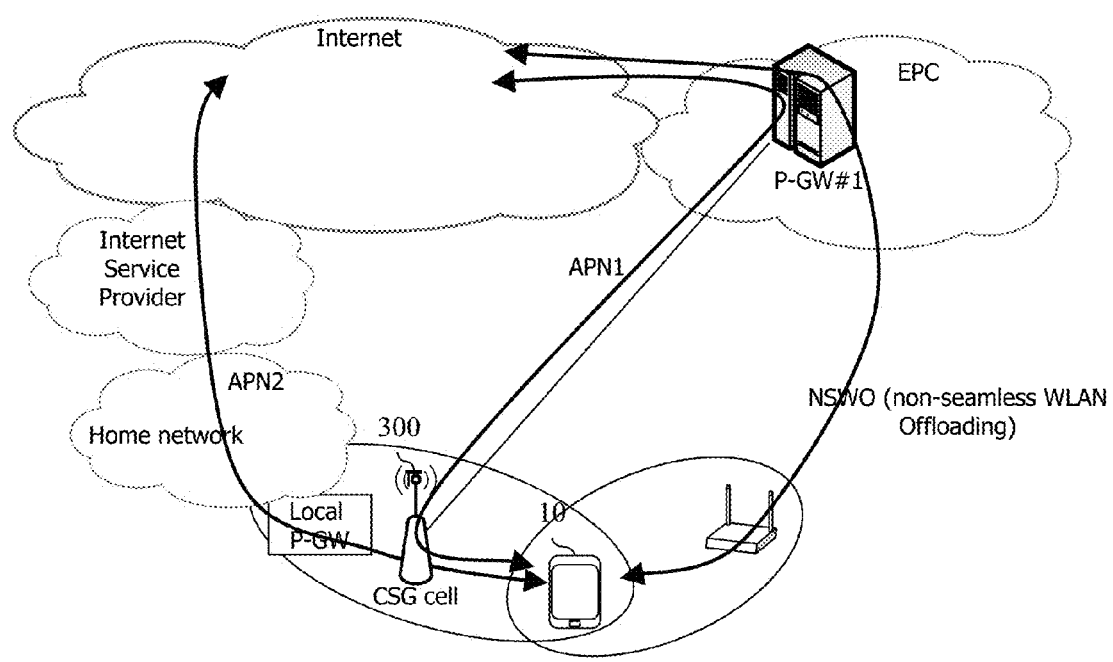
FIG. 10 shows a situation in which a plurality of accesses are available.

FIG. 10 Shows a Situation in Which a Plurality of Accesses are Available.

Referring to FIG. 10, a UE 100 is in a state of accessing a CSG cell through a small cell 300 such as a home (e)NodeB. In this case, there are two accesses (IFOM enabled) to an EPC of a mobile communication operator. That is, a PDN connection (APN1) is present, and a PDN connection (APN2) to a local network is present.

In this case, regarding any Internet traffic, a PDN2 may be selected according to the IARP, and WiFi may be selected through an IFOM rule related to the PDN1 according to the ISRP. In this case, since Internet traffic can be bilaterally transmitted, there is a problem in that one of the two must be selected.

Figure 11:
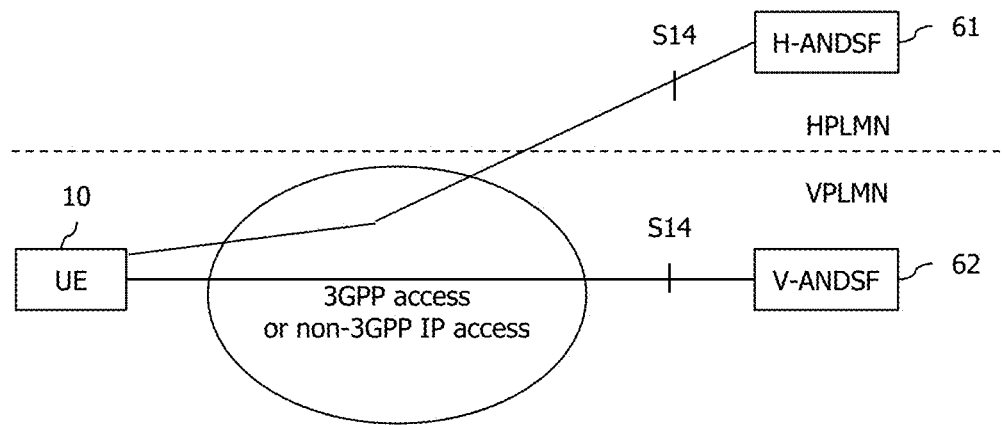
FIG. 11 shows an ANDSF existing not only in a home network but also in a visited network.

FIG. 11 Shows an ANDSF Existing Not Only in a Home Network But Also in a Visited Network.

As can be seen from FIG. 11, the ANDSF may exist in the home network (i.e., home PLMN, hereinafter HPLMN) of a UE 100, or may exist in the visited network (i.e., visited PLMN, hereinafter VPLMN).

An H-ANDSF 610 may provide an ISRP and an IARP to the UE 100 according to a communication requirement and a roaming contract. A V-ANDSF 620 may provide the ISRP to the UE 100 according to the communication requirement and the roaming contract.

Accordingly, after receiving the ISRP and the IARP from the H-ANDSF 610, the UE 100 may also receive the ISRP from the V-ANDSF 620 when roaming to a visited network of a different operator. In this case, the UE 100 first evaluates the IARP received from the H-ANDSF 610. Thereafter, the ISRP of the V-ANDSF 620 is evaluated. In this case, a result of evaluating the IARP received from the H-ANDSF 610 may be different from a result of the ISRP received from the V-ANDSF 620.

Further, it is assumed in the aforementioned example of FIG. 10 that the IARP of the H-ANDSF 610 is determined to prefer the PDN2, and the ISRP is determined to prefer WiFi of the PDN2. On the other hand, it is assumed that an operator of a visited network is determined to be served through the V-ANDSF 620, and Internet traffic is determined to be served through the WiFi of the PDN1. Herein, a problem lies in that a deployment is contrary to each other since the UE 100 prefers the PDN2 due to the IARP provided from the H-ANDSF 610, which differs from a policy (i.e., the WiFi of the PDN1) provided from the V-ANDSF 620.

Brief Description on Solution Proposed in Present Specification

Meanwhile, the solution proposed in the present specification is described below in brief An analysis on the aforementioned situations can be simplified as follows. That is, a case where LIPA is applied and a case where NSWO is further applied thereto can be considered by using a basic scenario of a plurality of PDNs in a core network as a basic scenario.

First situation: a plurality of PDN connections directed to the core network

Second situation: a plurality of PDNs directed to the core network+LIPA

Third situation: a plurality of PDNs directed to the core network+LIPA+NSWO

Meanwhile, since a home operator of the UE 100 manages information on an APN, the UE 100 may transmit traffic even if roaming is performed, by determining a preferred APN or NSWO for each IP flow according to the IARP. In case of a visited network of a different operator to which the UE 100 has roamed, since an IARP of the roaming UE cannot be managed, the operator of the visited network manages traffic by using the ISRP. As the ISRP, an access of an IFOM-enabled PDN connection may be selected or the NSWO may be selected.

In summary, each IP interface may have a different preference for each operator of a home network or for each operator of a visited network. That is, each operator may provide a routing rule according to its preference. That is, the operator of the home network may provide a preference through the IARP or the IARP, and a different operator of a visited network to which the UE 100 has roamed may provide a preference through the ISRP. Accordingly, if results are different from each other, the UE 100 must be able to perform a final selection. However, for a solution thereof, it is difficult to apply a specific rule, and a mediation or specific configuration is necessary between operators.

Further, in summary, according to the conventional technique, if a policy for traffic transmission is used, as a result thereof, an APN or an NSWO is selected when conforming to the IARP, but a preferred radio access or NSWO is selected through the IFOM when conforming to the ISRP. Herein, the NSWO is selected if the NSWO is selected in only one of the two. A case where the APN and the radio access (selected by the IFOM rule) are selected together is a problem. If the selected APN is irrelevant to an IFOM rule, one of the two must be selected. Table 2 below is used by reference.

TABLE 2

| | | IARP | |
|---|---|---|---|
| ISRP | IFOM | APN | NSWO |
| | | APN/Access by IFOM rule | NSWO |
| | NSWO | NSWO | NSWO |

Table 2 above indicates an output selected in the IARP and the IARP when the IARP and the ISRP are evaluated respectively, and each cell indicates a final result. Herein, if the APN and the IFOM are selected, one of the two must be selected.

For example, the APN may be an LIPA APN which is a path passing through a home eNodeB and a local-GW. In case of the IFOM, since a WiFi access may be present with a PDN connection directed to a network of a mobile communication operator, two paths are different from each other. Therefore, a selection problem arises in different results. As a solution for this, according to one embodiment of the present specification, a flag for determining a priority for the IARP and the ISRP may be used, and an example thereof is described below.

Solution: IARP Preferred Flag (On/Off)

If the IARP preferred flag is On, an APN of the IARP is selected, and otherwise, a preferred wireless access is selected through the IFOM. When a UE roams to a visited network of a different operator, the IARP which is a policy based on an operator of a home network may be preferentially applied, and the ISRP which is a policy based on an operator of a visited network may be applied with a next priority. For this, the IARP preferred flag may be configured in unit of a PLMN. That is, whether it is preferred may be designated for each PLMN.

Meanwhile, in most cases, the APN is distributed so that the operation of the home network provides a specific service to a subscriber. Therefore, in a roaming case, it is difficult for the operator of the visited network to operate the APN. Therefore, the IARP is valid only in the policy of the operator of the home network. In the conventional case, the ISRP which is the policy based on the operator of the visited network is preferentially used, which leads to a possibility of collision. That is, since each result may be obtained similarly to the aforementioned description, if two policies (IARP vs. ISRP or home vs. visited) are possible to solve a selection problem, it can be solved by providing a flag by which any one of the two is preferential. A solution thereof is described below.

Solution: IARP Preferred Flag

In case of an operator of a home network, the IARP and the ISRP may be included in a policy based on the operator of the home network. In this case, a UE 100 performs evaluation according to each of the IARP and the ISRP, and one of the two must be preferential. In this case, when an IARP preferred flag is On, an IARP result is selected, and otherwise an ISRP result is selected. The same may also be applied when the policy based on the operator of the home network is preferentially applied in a situation where the UE has roamed to a visited network of a different operator. That is, in a roaming situation, the same may also be applied for selection on a result when the IARP (the operator of the home network) is first evaluated, and the ISRP (based on the operator of the visited network) is subsequently evaluated. For this, the IARP preferred flag may be added into the IARP, and may be designated for each PLMN. That is, when the UE 100 moves to another PLMN, if the IARP preferred flag is On, a result of the IARP which is a policy of the operator of the home network is preferential. Otherwise, a policy of the operator of the visited network is selected.

The IARP preferred flag may be delivered together when the ANDSF delivers the IARP. Therefore, the IARP preferred flag may be used when the UE 100 selects an IP interface to transmit uplink data. This is shown in the following flowchart.

Figure 12:
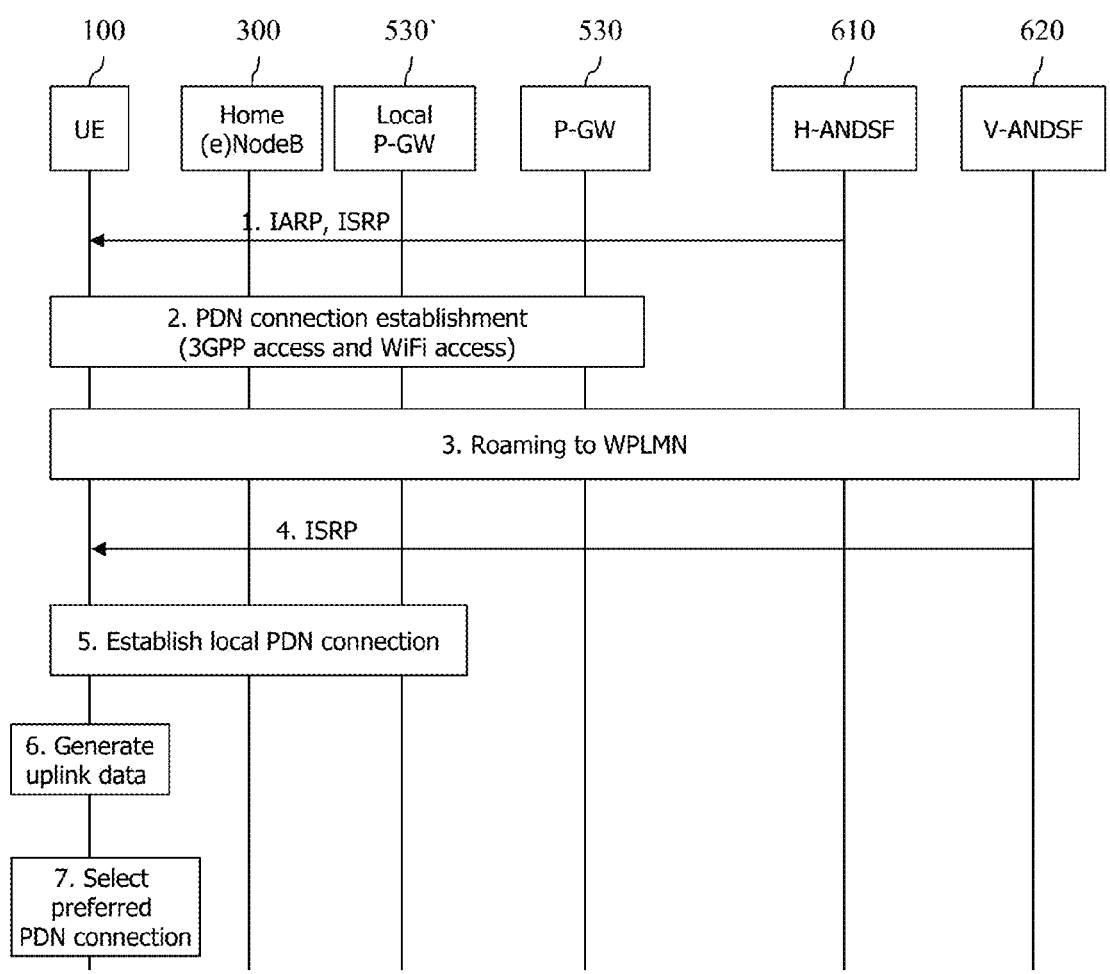
FIG. 12 is a signal flow showing a procedure according to one embodiment proposed in the present specification.
Figure 13:
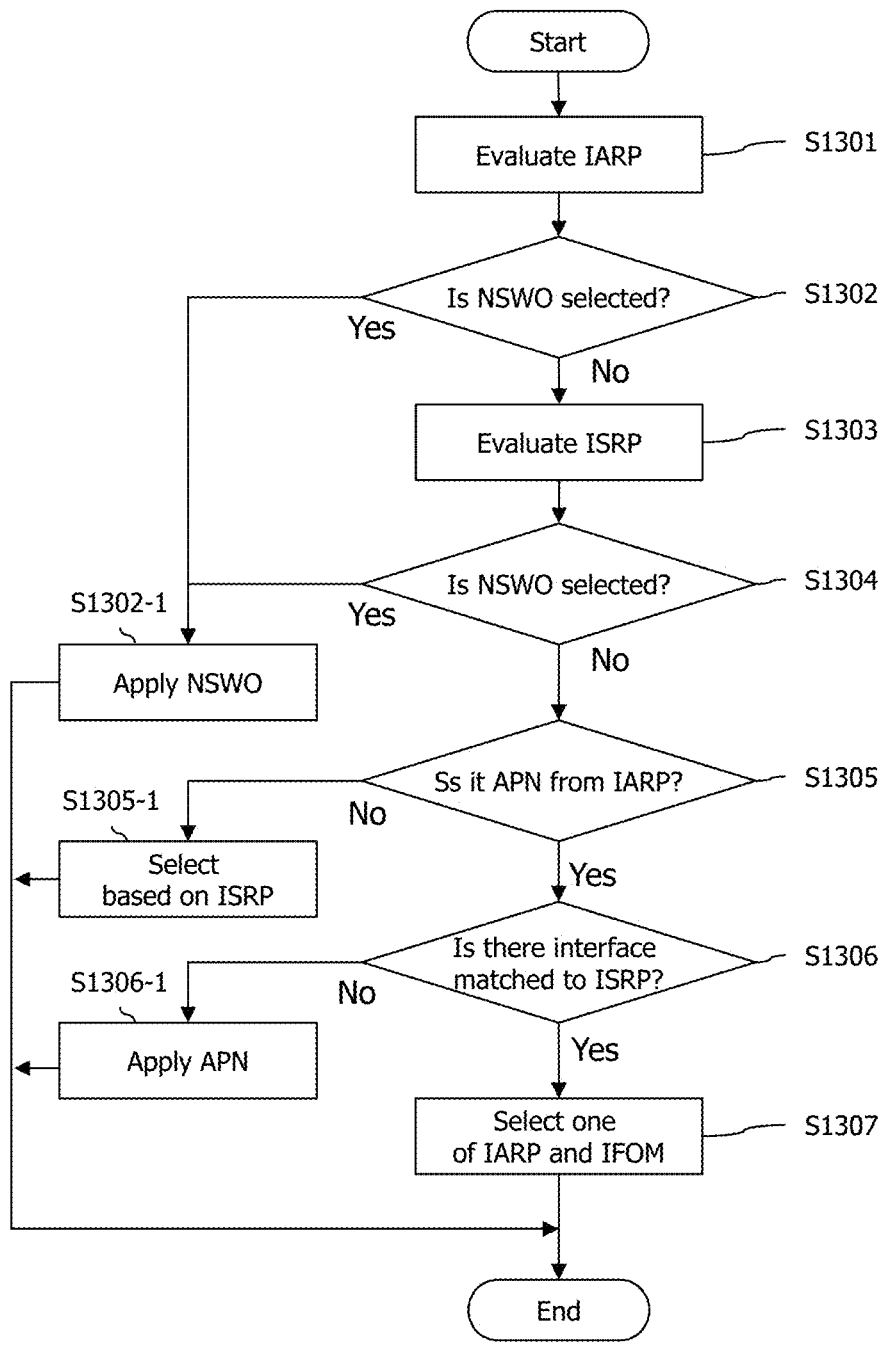
FIG. 13 is a flowchart showing one process of FIG. 12 in greater detail.

FIG. 12 is a Signal Flow Showing a Procedure According to One Embodiment Proposed in the Present Specification, and FIG. 13 is a Flowchart Showing One Process of FIG. 12 in Greater Detail.

Referring to FIG. 12, an H-ANDSF 610 of a home network provides a policy based on an operator of the home network, i.e., an IARP and an ISRP, to a UE 100. In this case, an IARP preferred flag may be provided together to the UE 100.

The UE 100 creates a PDN connection (i.e., Internet APN). In this case, the PDN connection may be created through a cellular access and a WiFi access according to IFOM.

The UE 100 roams to a visited network of a different operator, i.e., to a VPLMN.

Then, the policy, i.e., ISRP, based on the different operator of the visited network may be provided to the UE 100 by the V-ANDSF 620.

The UE 100 creates a local PDN connection in a CSG cell.

Thereafter, the UE 100 creates Internet data to be transmitted.

Then, the UE 100 selects a preferred path by comparing the IARP based on an operator of a home network and the ISRP based on a different operator of the visited network. For example, if a local PDN connection is preferred when conforming to the IARP and if WiFi based on an IFOM rule is preferred when conforming to the ISRP, the preferred path is selected by considering an IARP preferred flag.

When there are several available IP interfaces, a selecting process performed by the UE 100 will be described in greater detail with reference to FIG. 13.

First, the UE 100 evaluates an IARP (S1301). If NSWO is selected as a result of evaluating the IARP (S1302), the NSWO is applied (S1302-1). However, if the NSWO is not selected, the ISRP is evaluated (S1303). If the NSWO is selected as a result of evaluating the ISRP (S1304), the NSWO is applied (S1304-1). However, if the NSWO is not selected, it is determined whether an APN is selected by the IARP (S1305). If the APN is not selected, any one is selected and applied according to the ISRP (S1305-1). However, if the APN is selected, it is determined whether an interface matched to the ISRP exists (S1306). If there is no matched one, only the selected APN is applied (S1306-1).

However, if the matched interface exists, any one of an APN based on the IARP and IFOM based on the ISRP is selected. In this case, if an IARP preferred flag is On, only the APN based on the IARP may be selected.

The methods described up to now can be implemented in hardware. The hardware implementation will be described with reference to FIG. 14.

Figure 14:
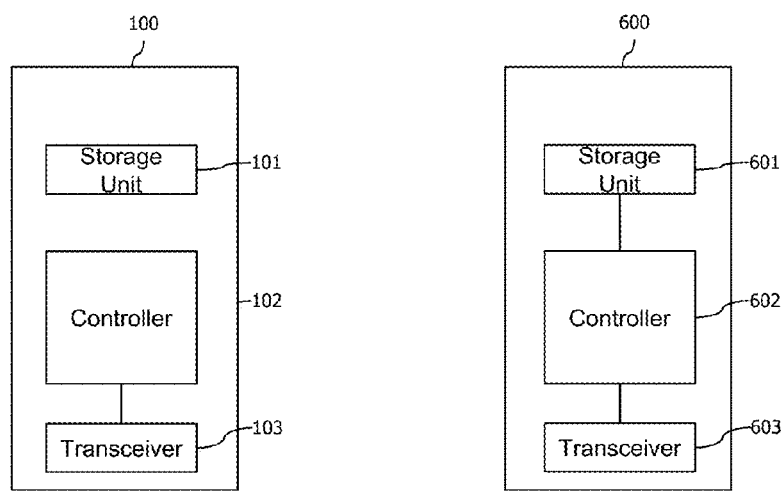
FIG. 14 is a block diagram of a user equipment (UE) 100 and an ANDSF 600 according to the present invention.

FIG. 14 is a Block Diagram of a UE 100 and an ANDSF 600 According to the Present Invention.

As shown in FIG. 14, the UE 100 includes a storage element 101, a controller 102, and a transceiver 103. Further, the ANDSF 600 includes a storage element 601, a controller 602, and a transceiver 603.

The storage elements 101 and 601 store the aforementioned method.

The controllers 102 and 112 control the storage elements 101 and 601 and the transceivers 103 and 603. More specifically, the controllers 102 and 602 execute each of the methods stored in the storage elements 101 and 601. Further, the controllers 102 and 602 transmit the aforementioned signals via the transceivers 103 and 603.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. An access selection method comprising:
    receiving, by a user equipment (UE), an inter access point name (APN) routing policy (IARP) from an access network discovery and selection function (ANDSF) of a home public land mobile network (HPLMN);
    receiving, by the UE, an inter-system routing policy (ISRP) from an access network discovery and selection function (ANDSF) of a visited public land mobile network (VPLMN) after the UE roams from the HPLMN to the VPLMN;
    checking, by the UE, a preferred flag if there is a collision between the IARP received from the ANDSF of the HPLMN and the ISRP received from the ANDSF of the VPLMN; and
    using, by the UE, either the received IARP or the received ISRP according to the preferred flag,
    wherein the preferred flag is configured in a unit of each different types of PLMNs.

2. The method of claim 1, wherein the preferred flag is received together with the IARP.

3. A user equipment comprising:
    a transceiver; and
    a processor for controlling the transceiver, wherein the processor is configured to
        receive an inter access point name (APN) routing policy (IARP) from an access network discovery and selection function (ANDSF) of a home public land mobile network (HPLMN);
        receive an inter-system routing policy (ISRP) from an access network discovery and selection function (ANDSF) of a visited public land mobile network (VPLMN) after the UE roams from the HPLMN to the VPLMN;
        check a preferred flag if there is a collision between the IARP received from the ANDSF of the HPLMN and the ISRP received from the ANDSF of the VPLMN; and
        use either the received IARP or the received ISRP according to the preferred flag,
    wherein the preferred flag is configured in a unit of each different types of PLMNs.

4. The user equipment of claim 3, wherein the preferred flag is received together with the IARP.

* * * * *